US 6,412,986 B1

(12) United States Patent
Ngo et al.

(10) Patent No.: US 6,412,986 B1
(45) Date of Patent: Jul. 2, 2002

(54) ADAPTER FOR ASSEMBLING MULTIPLE OPTICAL CONNECTORS

(75) Inventors: Hung Viet Ngo, Harrisburg; Lewis Robin Johnson, Liverpool, both of PA (US)

(73) Assignee: Berg Technology, Inc., Reno, NV (US)

( * ) Notice: Subject to any disclaimer, the term of this patent is extended or adjusted under 35 U.S.C. 154(b) by 0 days.

(21) Appl. No.: 09/608,666

(22) Filed: Jun. 30, 2000

(51) Int. Cl.[7] .............................. G02B 6/36; G02B 6/38
(52) U.S. Cl. ........................ 385/53; 385/59; 439/540.1
(58) Field of Search ............................. 385/53, 54, 55, 385/56, 57, 58, 59; 439/540.1

(56) References Cited

U.S. PATENT DOCUMENTS

| | | | |
|---|---|---|---|
| 4,361,372 A | 11/1982 | Majkrzak et al. | 339/64 M |
| 4,432,604 A | 2/1984 | Schwab | 350/96.21 |
| 5,080,461 A | 1/1992 | Pimpinella | 385/65 |
| 5,123,071 A | * 6/1992 | Mulholland et al. | 385/53 |
| 5,553,180 A | 9/1996 | Belenkiy et al. | 385/59 |
| 5,828,805 A | 10/1998 | Morlion et al. | 385/59 |
| 5,883,998 A | 3/1999 | Stevens et al. | 385/134 |
| 5,930,425 A | 7/1999 | Abel et al. | 385/53 |
| 5,931,688 A | 8/1999 | Hasz et al. | 439/247 |
| 5,937,121 A | * 8/1999 | Ott et al. | 385/59 |
| 5,980,312 A | 11/1999 | Chapman et al. | 439/540.1 |
| 6,041,155 A | * 3/2000 | Anderson et al. | 385/139 |
| 6,173,099 B1 | * 1/2001 | Kiernicki et al. | 385/78 |
| 6,227,718 B1 | * 5/2001 | Harvey et al. | 385/55 |

* cited by examiner

Primary Examiner—Brian Sircus
Assistant Examiner—Michael C. Zarroli
(74) Attorney, Agent, or Firm—Perman & Green, LLP (57) ABSTRACT

An optical connector adapter for connecting optical connectors comprising a frame adapted to be mounted to a printed circuit board; and at least one adapter housing movably mounted in a receiving area of the frame. The optical connector adapter is independently floatable along a Z-axis relative to the frame. The adapter housing is sized and shaped to receive at least two optical connectors therein and individually fixedly connect the optical connectors to the adapter housing. The optical connectors are received in opposite directions into the adapter housing and connect to each other inside the adapter housing.

26 Claims, 6 Drawing Sheets

ADAPTER FOR ASSEMBLING MULTIPLE OPTICAL CONNECTORS

BACKGROUND OF THE INVENTION

1. Field of the Invention

The present invention relates to optic connectors and, more particularly, to a system and method for ganging optical connectors together.

2. Brief Description of Prior Developments

U.S. Pat. No. 4,432,604 discloses a self-adjusting fiberoptic connector assembly having optical fiber plugs connected to a backplane by movable brackets. U.S. Pat. No. 5,828,805 discloses a multifiber optical connector plug. U.S. Pat. No. 4,361,372 discloses a connector panel for an electronic cabinet having spring-loaded cells for a floating plate on a connector panel.

Problems exist with conventional optical fiber connector adapters in that alignment is sometimes unsatisfactory and latching of optical connectors to the adapter is sometimes unsatisfactory. Conventional multi-connection adapters comprise multi-piece frames which use epoxy to assemble the frames. Frame assembly takes up manufacturing time and can create quality control problems. Conventional adapters also do not necessarily provide adequate connector float in an axis of connector insertion (z-axis float). There is a desire for an adapter frame to have a stronger body, better latching and better alignment. There is also a desire for spring action of individual adapter housings to compensate for various optical connector connection conditions and allow for greater z-axis float of optical connectors being attached to the adapter. In addition, there is a desire to provide a faster assembly process for assembling an optical fiber connector adapter with greater quality control and without use of epoxy.

SUMMARY OF THE INVENTION

In accordance with one embodiment of the present invention, an optical connector adapter is provided for connecting multiple optical connectors. The adapter comprises a frame adapted to be mounted to a printed circuit board; and at least one adapter housing movably mounted in a receiving area of the frame. The adapter housing is sized and shaped to receive at least two optical connectors therein and individually fixedly connect the optical connectors to the adapter housing. The optical connectors are received in opposite directions into the adapter housing and connect to each other inside the adapter housing.

In accordance with another embodiment of the present invention, an optical connector adapter is provided for connecting optical connectors comprising a frame adapted to be mounted to a printed circuit board; at least one adapter housing movably mounted in a receiving area of the frame; at least one retainer connected to the frame for preventing the adapter housing from exiting the receiving area out of a first side of the frame; and at least one spring between the frame and the adapter housing biasing the adapter housing in a first direction towards the first side. The adapter housing is movable relative to the frame in a second opposite direction with resilient deflection of the spring.

In accordance with one method of the present invention, a method of assembling an optical connector adapter for connecting optical connectors on a backplane member is provided comprising steps of inserting a plurality of adapter housings into at least one receiving area of an adapter frame, the frame being adapted to be mounted to the backplane member, and the adapter housings each being adapted to removably connect two of the optical connectors thereto in opposite directions; locating springs between the adapter housings and the adapter frame; and connecting at least one retainer to the adapter frame to prevent the adapter housings from exiting the receiving area in a first direction. The adapter housings are movably mounted to the adapter frame and biased by the springs in the first direction relative to the adapter frame.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
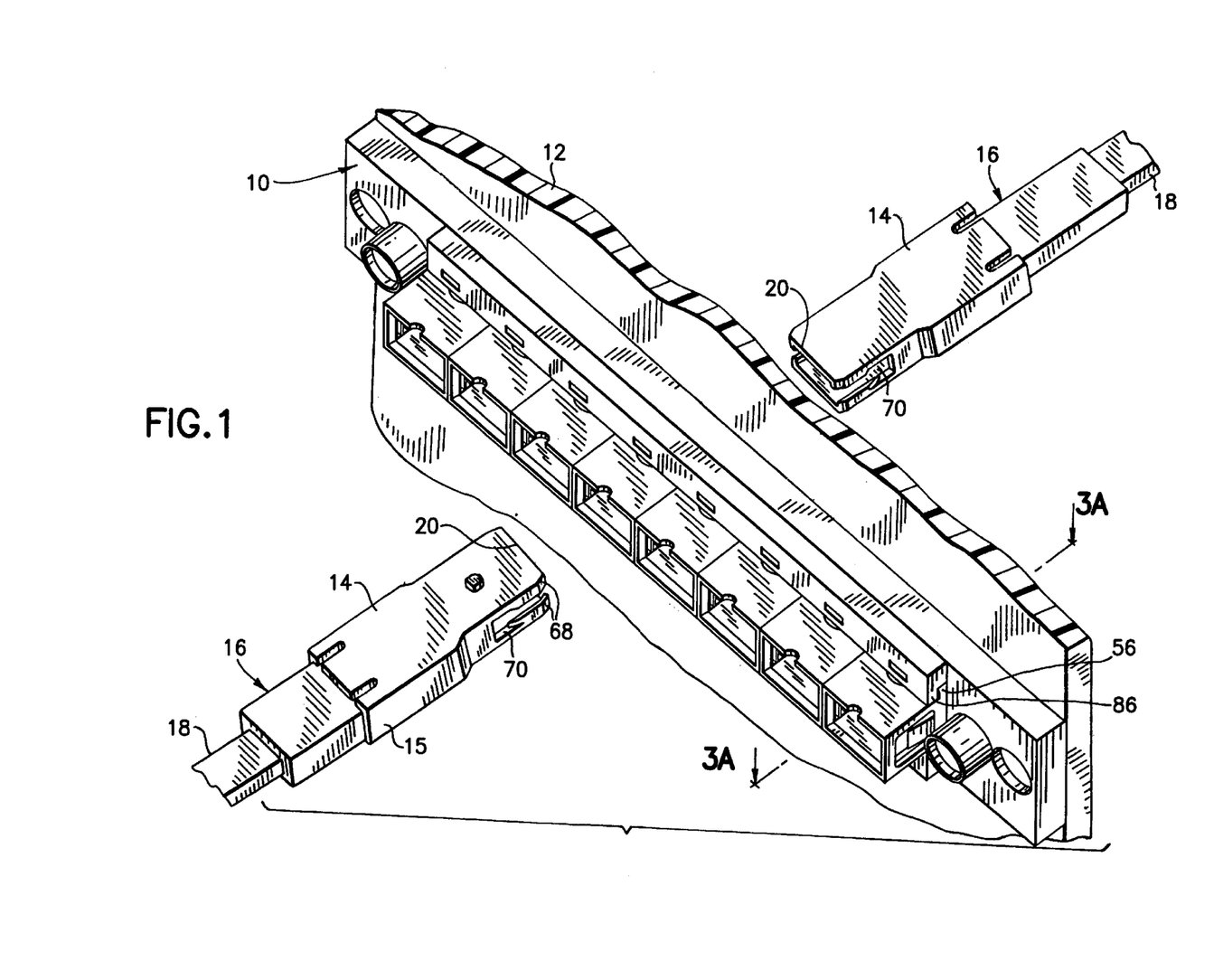
FIG. 1 is a perspective view of an optical fiber connector adapter incorporating features of the present invention shown attached to a backplane member and showing two fiber optical cable and connector assemblies.

Referring to FIG. 1, there is shown a perspective view of an optical fiber connector adapter 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

The adapter 10 is shown attached to a backplane member 12. The backplane member is preferably a printed circuit board or multiple layer board. However, in alternate embodiments the backplane member could be any suitable structural member or, alternatively, the member 12 could be a printed circuit board which is not being used as a backplane member, or is merely part of an optical connector box housing or combined electrical and optical connector box housing. The adapter 10 is generally adapted to individually support fiber optic connectors 14. The connectors 14 are part of fiber optic cable assemblies 16. The cable assemblies 16 include optical fiber cables 18 having multiple optical fibers. The connectors 14 are similar to the connector described in U.S. Pat. No. 5,828,805 which is hereby incorporated by reference in its entirety. Ferrules of the connectors 14 precisely locate ends of the optical fibers in the connectors at front ends of the ferrules. Pins (not shown) extending out the front end of a ferrule in one of the connectors 14 are matingly received in holes of a ferrule in the mating connector 14 when the two front ends 20 of the connectors 14 meet inside the adapter 10.

Figure 2:
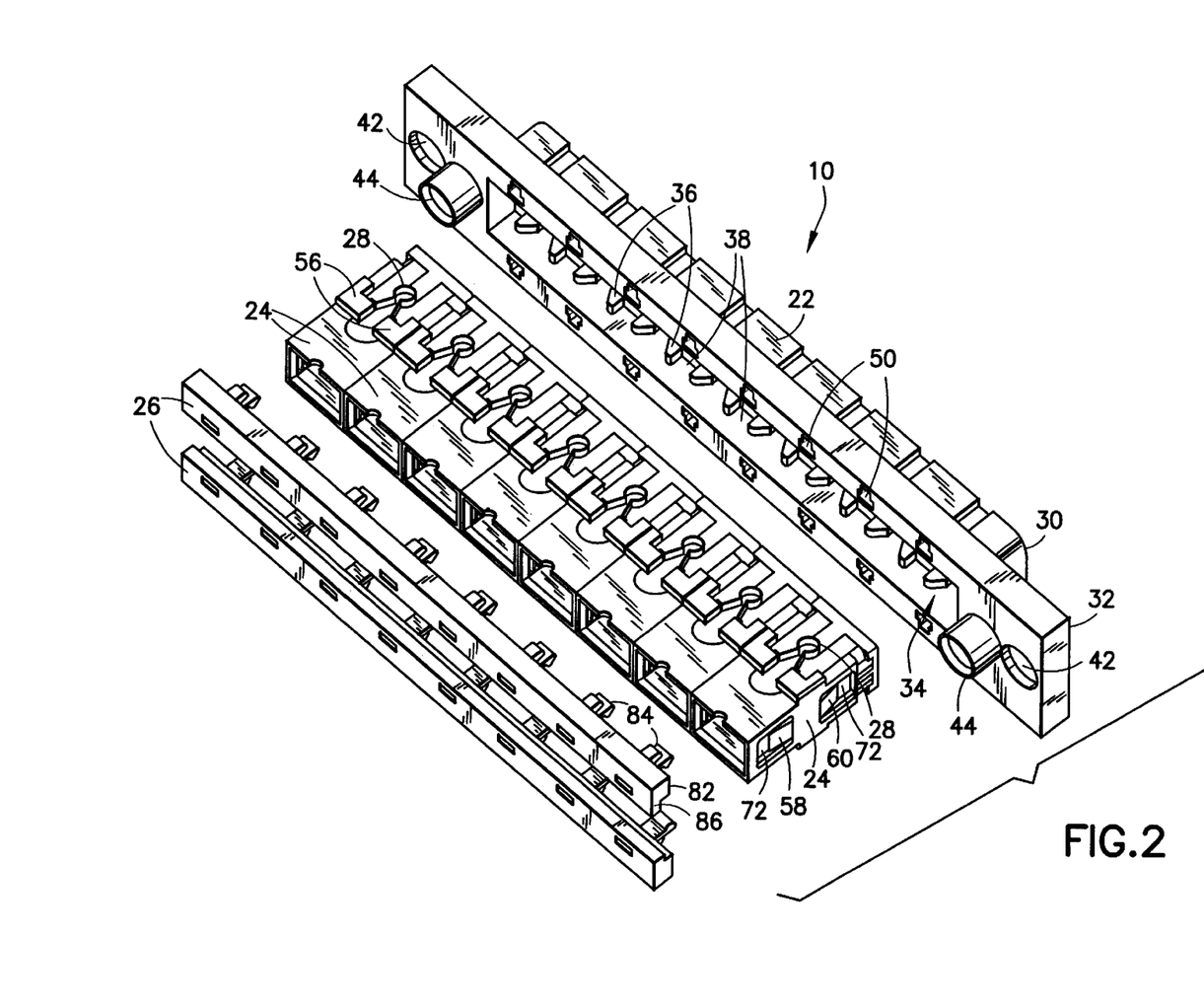
FIG. 2 is an exploded perspective view of the adapter shown in FIG. 1.
Figure 3A:
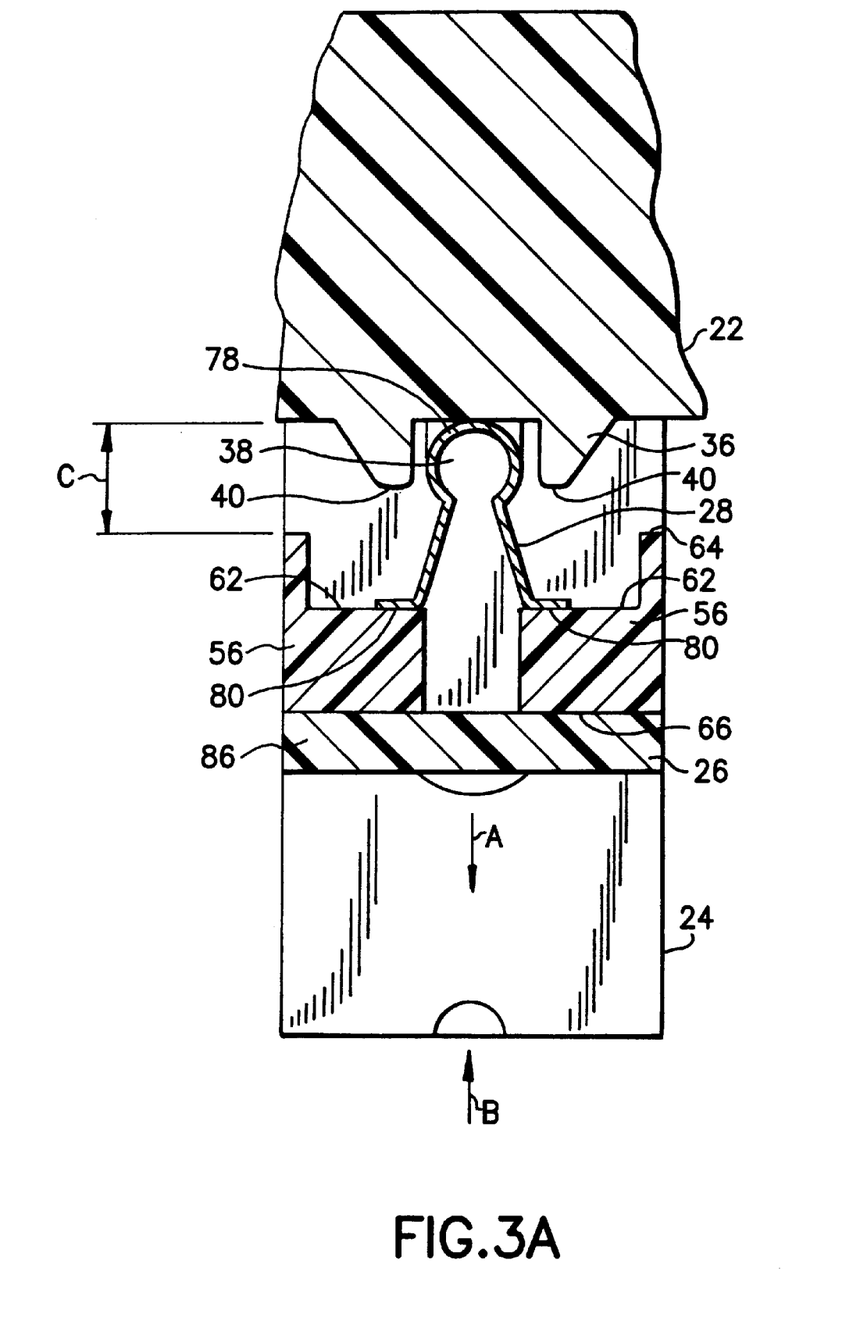
FIG. 3A is a partial cross-sectional view of the adapter shown in FIG. 1 taken along line 3A—3A.

Referring also to FIG. 2, the adapter 10 generally comprises a frame 22, adapter housings 24, retainers 26, and springs 28. The frame 22 is preferably a one-piece member comprised of molded polymer material. However, in alternate embodiments, the frame could be comprised of multiple members and any suitable type(s) of material. The frame 22 generally comprises a receiving section 30 surrounded by a flange section 32. The receiving section 30 is sized and shaped to fit inside a hole in the backplane member 12. The receiving section 30 includes a single receiving area 34. In alternate embodiments the receiving section 30 could have multiple receiving areas separated from each other. Referring also to FIG. 3A, the receiving section 30 includes guides 36 on the top and bottom sides of the receiving area 34. The guides 36 include a spring receiving area 38 and front end stop surfaces 40. However, in alternate embodiments, any suitable shape for interacting with the springs and limiting movement of the housings 24 on the frame 22 could be provided. The flange section 32 includes holes 42 for receiving fasteners (not shown) for fixedly mounting the frame 22 to the backplane member 12. The ends of the flange section 32 also includes mounts 44 for receiving guide pins 46 for a mating gang assembly 48 shown in FIG. 4 and described below. However, the mounts 44 need not be provided and, any suitable means could be used to connect the frame to the backplane member. The flange section 32 also includes snap-lock mounting holes 50 into its front face on top and bottom sides of the receiving area 34.

Figure 3B:
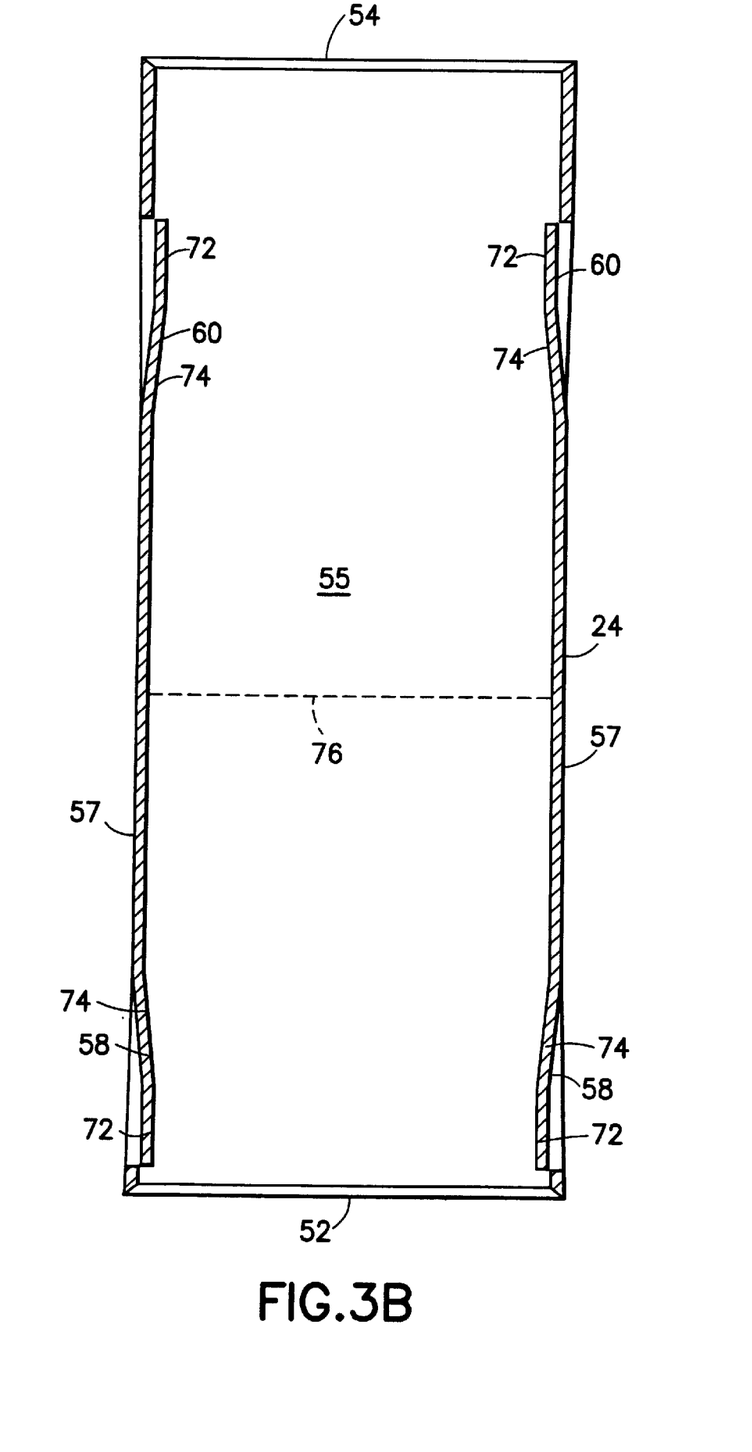
FIG. 3B is a cross-sectional view of one of the adapter housings shown in FIG. 2.

The housings 24 preferably comprise one-piece members made of molded polymer material. However, in alternate embodiments, the housings could each be comprised of multiple members and any suitable type(s) of material could be used. The housings 24 each form a general rectangular box shape with open front and rear ends 52,54, a center channel 55 between the open ends, top and bottom walls having projections 56 on an exterior, and side walls 57 having latches 58,60. In this embodiment the top and bottom projections 56 have substantially the same shape. As seen best in FIG. 3A the projections 56 include rear facing spring support surfaces 62, rear facing stop surfaces 64, and front facing surfaces 66. As seen best in FIG. 3B, the latches 58,60 project inward into the center channel 55. The latches 58,60 face in opposite directions at the ends 52,54 respectively. The latches 58,60 are resiliently deflectable in lateral outward directions as the plug connectors 14 are inserted into the center channel 55. As seen in FIG. 1, the outer housings 15 of the connectors 14 include side walls with a front cam surface 68 and latch areas 70. The latches 58,60 include enlarged sections 72 connected to the rest of the housing 24 by deflectable arms 74. When the plugs 14 are inserted into the housings 24, the front cam surfaces 68 can wedge the latches 58,60 outward. The enlarged sections 72 can deflect back inward into the latch areas 70 when the front ends 20 of the plugs 14 reach the mating junction line 76 for the cooperating pair of plugs. The latches 58,60 can thus fixedly and stationarily as well as removably connect the plugs 14 individually to its respective housing 24. Preferably, with sufficient withdrawal force on the plug 14, the plugs 14 can be removed from their respective housing. In alternate embodiments any suitable means could be used to individually connect the plugs 14 to the opposite ends of the individual housings 24. In an alternate embodiment a single adapter housing could house more than two connector plugs. In the embodiment shown, the adapter 10 comprises eight of the housings 24. However, in alternate embodiments the adapter could comprise more or less than eight housings. In the embodiment shown, the housings 24 are aligned in a single side-by-side row in the receiving area 34 of the frame. However, in alternate embodiments the housings 24 could be arranged in any suitable array in any suitably shaped frame receiving area(s).

In this embodiment, each housing 24 is provided with two of the springs 28. One spring 28 is located on the top side of the housing and one spring is located on the bottom side of the housing. In alternate embodiments each housing 24 could have more or less than two springs or one spring could spring load more than one housing 24 on the frame 22. As seen best in FIG. 3A, in this embodiment each spring 28 generally comprises a leaf spring having a center rear section 78 and two front end feet 80. However, in alternate embodiments the spring could have any suitable shape or orientation, or the spring could be an integral part of the frame 22 or the housing 24. The center rear section 78 is positioned in the spring receiving area 38 of the frame 22. The front end feet 80 are located against the rear facing spring support surfaces 62 of the projections 56 on the housing 24. The springs 28 bias the housings 24 relative to the frame 22 in a forward direction A. However, the housings 24 can individually move or longitudinally slide relative to each other and relative to the frame 22 in direction B with the feet sliding along surface 62. In a preferred embodiment the length C of travel of the housing 24 relative to the frame 22 is about 2 mm. However, any suitable length C could be provided. Movement of the housings 24 in directions A and B provide a Z-axis float for the connector plugs 14 relative to the backplane member 12 when connecting the connector plugs 14 to the housings 24 in direction B.

In order to retain the housings 24 with the frame 22, and prevent the springs 28 from pushing the housings 24 out of the front end of the receiving area 34, the assembly 10 includes the retainers 26. Each retainer 26 is preferably a one-piece member comprised of molded polymer material. However, in alternate embodiments, each retainer could be comprised of multiple members and any suitable type(s) of material could be used. In addition, more or less than two retainers could be used. In the embodiment shown, the retainers 26 are substantially the same, but merely reversely orientated relative to each other. Each retainer 26 generally comprises a base section 82, snap-lock mounting sections 84, and a retaining lip section 86. The snap-lock mounting sections 84 are suitably sized and shaped to be received in the snap-lock mounting holes 50 in the front face of the frame 22 to fixedly attach the retainers 26 to the frame 22. However, any suitable means could be used to attach the retainers to the frame. The retaining lip sections 86 extend towards each other across portions of the front entrance of the receiving area 34. The retaining lip sections 86 extend in front of the front facing surfaces 66 of the projections 56 of the housings 24. Thus, the retaining lip sections 86 function as limits or stops to the forward movement of the projections 56 out of the receiving area 34. This retains the housings 24 with the frame 22 and against the springs 28. In a preferred embodiment the springs 28 apply a preload force of the housings 24 against the retainers 26. The present invention allows the housings 24 to independently move relative to each other and the frame 22. The housings 24 can slide against adjacent housings. This independent Z-axis float for each housing 24 can compensate for tolerances between the backplane member 12 and a daughter printed circuit board, having one or more of the connectors 14 thereon, being connected to a connector on the backplane member. While Z-axis float has been discussed, it should be pointed out that the positioning of the housings 24 in the frame 22 by retainers 26 can also allow for some movement of the housings 24 in the X- and Y-axes as well.

Figure 4:
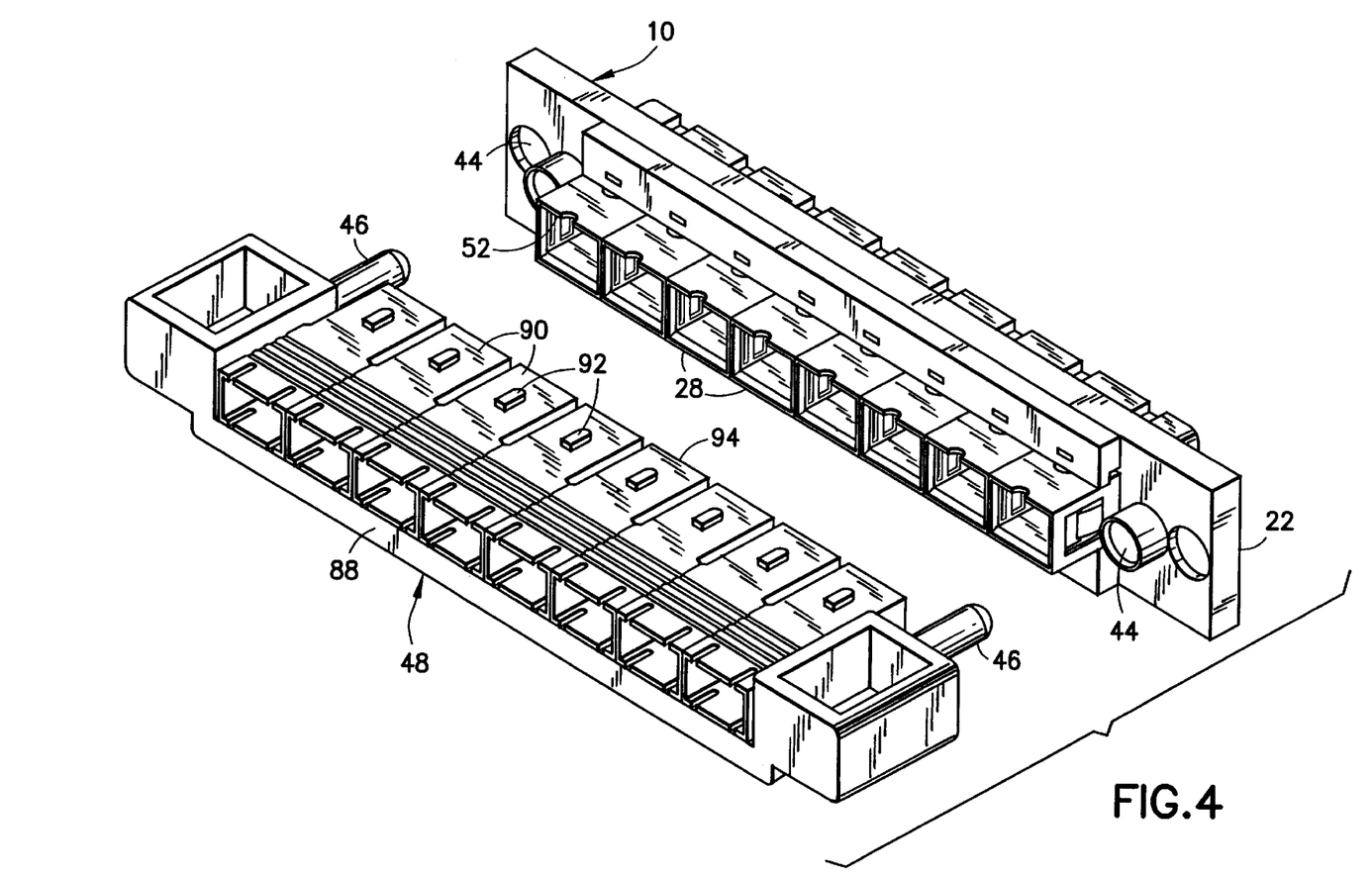
FIG. 4 is a perspective view of the adapter shown in FIG. 1 and a gang assembly for ganging multiple fiber optical connectors together for connection to the adapter.

FIG. 1 shows an embodiment where the plug correctors 14 are individually connected to the adapter 10. One or more of the connectors could be mounted on a daughter printed circuit board. Referring now to FIG. 4, the adapter 10 is shown with a portion of a mating gang assembly 48. The gang assembly 48 is used to connect a plurality of the connector plugs 14 to each other and then insert the connector plugs as a group or gang into the adapter 10. In this embodiment the gang assembly 48 generally comprises a frame 88 and housings 90. The frame 88 can be mounted to a daughter printed circuit board. The housings 90 are each sized and shaped to receive one of the connector plugs 14 therein and fixedly connect to the outer housing 15 of the plugs 14. The housings 90 have limit projections 92 that contact the front end 52 of the housings 24 to limit insertion of the housings 90 into the housings 24. The connector plugs 14 extend past the front end 94 of the housings 90. The gang frame 88 includes a base member 96 and a top member (not shown) that stationarily sandwich the housings 90 therebetween in the array shown. In alternate embodiments, the frame 88 could support the housings 90 in any suitable type of array(s). The guide pins 46 are received in the mounts 44 of the frame 22 to guide the ganged connector plugs and housings 90 into their respective adapter housings 24.

Figure 5:
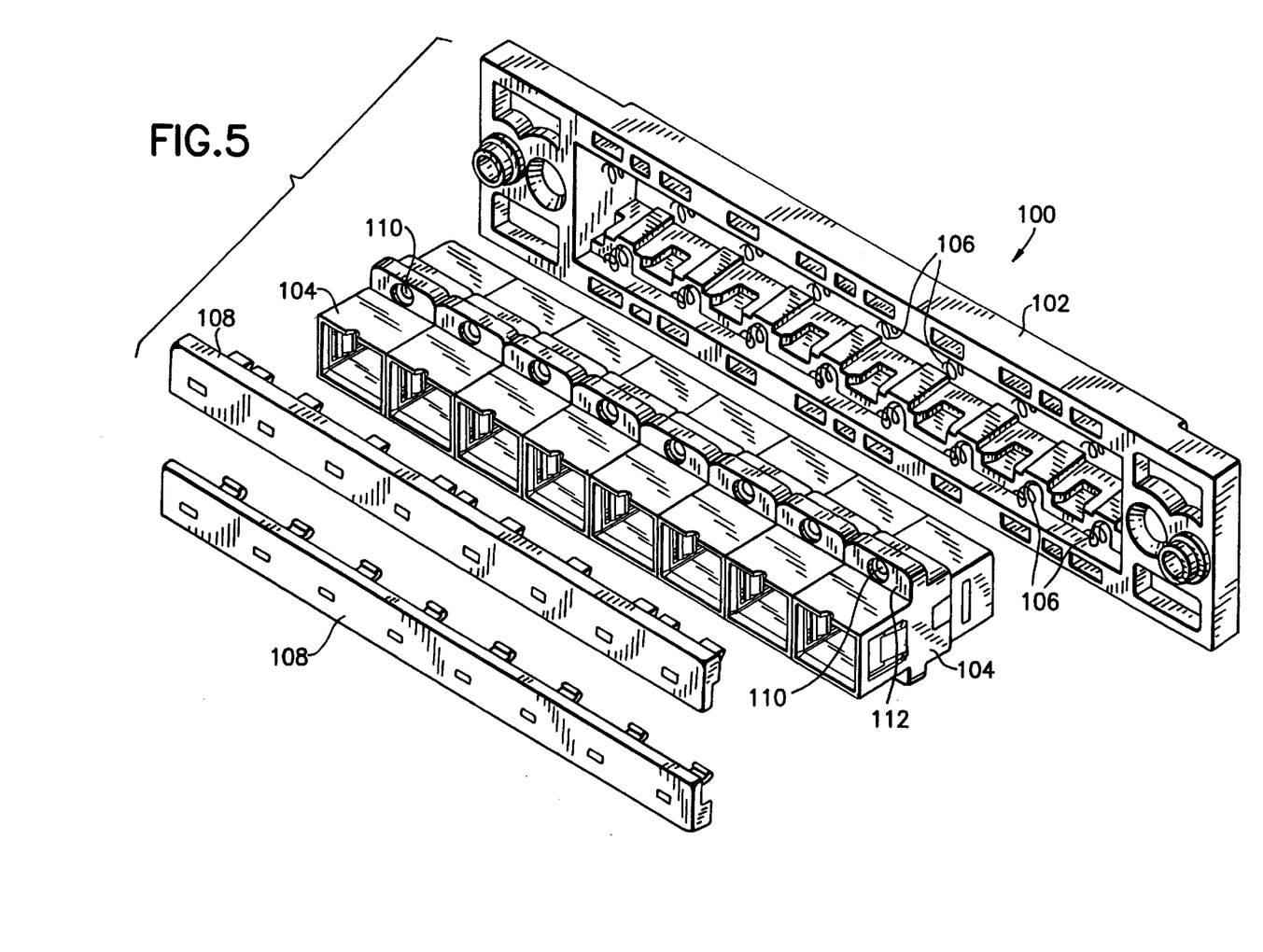
FIG. 5 is an exploded perspective view of an alternate embodiment of the adapter shown in FIG. 2.

Referring now to FIG. 5, an exploded view of an alternate embodiment of the adapter is shown. In this embodiment the adapter 100 generally comprises a mounting frame 102, adapter housings 104, springs 106 and retainers 108. In this embodiment the springs 106 comprise coil springs. However, any suitable type of springs could be provided. The frame 102 could have posts which the springs 106 are mounted on. The posts could extend through the holes 110 in the top and bottom projections 112 on the adapter housings 104. However, such posts need not be provided. The coil springs 106 contact the rear ends of the projections 112 to bias the adapter housings 104 in a forward position on the frame 102.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An optical connector adapter for connecting optical connectors, the adapter comprising:
   a frame adapted to be mounted to a printed circuit board; and
   at least one adapter housing movably mounted in a receiving area of the frame, the adapter housing including at least one spring on a surface of the adapter housing adapted to be received in a spring receiving area of the frame, wherein the spring is adapted to spring load the adapter housing on the frame; and
   wherein the adapter housing is adapted to receive at least two optical connectors therein and individually fixedly connect the optical connectors to the adapter housing, and wherein the optical connectors are received in opposite directions into the adapter housing and connect to each other inside the adapter housing.

2. An adapter as in claim 1 wherein the adapter comprises a plurality of the adapter housings located in the receiving area and separately movable relative to each other.

3. An adapter as in claim 2 wherein the adapter housings are located adjacent each other.

4. An adapter as in claim 1 further comprising at least one spring between portions of the frame and the at least one housing for biasing the at least one housing in a first direction relative to the frame.

5. An adapter as in claim 4 wherein the adapter comprises two of the springs for each of the housings, the springs being located at opposite sides of each housing.

6. An adapter as in claim 4 wherein the at least one spring comprises a leaf spring.

7. An adapter as in claim 4 wherein the at least one spring comprises a coil spring.

8. An adapter as in claim 4 further comprising at least one retainer connected to the frame, the at least one retainer having a portion located in a path of a portion of the at least one adapter housing for limiting movement of the adapter housing in the first direction.

9. An adapter as in claim 8 wherein the adapter comprises two of the retainers located on opposite sides of the at least one adapter housing.

10. An adapter as in claim 9 wherein each retainer contacts more than one of the adapter housings.

11. The adapter as in claim 1 wherein the adapter housing further comprises at least one projection on an exterior surface of the adapter housing, the projection adapted to provide a supporting surface against which the spring is biased when the spring receiving area of the frame is pressed against the spring when the adapter housing is movably mounted in the receiving area.

12. The adapter as in claim 1 wherein each adapter housing is adapted to move relative to each other and relative to the frame.

13. An adapter as in claim 1 wherein a movement of the adapter housing is in a Z-axis float relative to the printed circuit board.

14. An adapter as in claim 1 wherein the at least one adapter housing is movably mounted longitudinally relative to the frame.

15. An adapter as in claim 1 wherein the spring is adapted to spring load the adapter housing on the frame in a Z-axis float.

16. An adapter as in claim 1 wherein the spring is adapted to spring load the adapted housing on the frame in a horizontal plane.

17. An optical connector adapter for connecting optical connectors, the adapter comprising:
   a frame adapted to be mounted to a printed circuit board;
   at least one adapter housing movably mounted in a receiving area of the frame;
   at least one retainer connected to the frame for preventing the adapter housing from exiting the receiving area out of a first side of the frame; and
   at least one spring between the frame and the adapter housing biasing the adapter housing in a first direction towards the first side, wherein the adapter housing is movable relative to the frame in a second opposite direction with resilient deflection of the spring.

18. An adapter as in claim 17 wherein the adapter comprises a plurality of the adapter housings located in the receiving area and separately movable relative to each other.

19. An adapter as in claim 18 wherein the adapter housings are located adjacent each other.

20. An adapter as in claim 17 wherein the adapter comprises two of the springs for each of the housings located at opposite sides of each housing.

21. An adapter as in claim 17 wherein the at least one spring comprises a leaf spring.

22. An adapter as in claim 17 wherein the at least one spring comprises a coil spring.

23. An adapter as in claim 17 wherein the adapter comprises two of the retainers located on opposite sides of the at least one adapter housing.

24. An adapter as in claim 23 wherein each retainer contacts more than one of the adapter housings.

25. A method of assembling an optical connector adapter for connecting optical connectors on a backplane member, the method comprising steps of:

inserting a plurality of adapter housings into at least one receiving area of an adapter frame, the frame being adapted to be mounted to the backplane member, and the adapter housings each being adapted to removably connect two of the optical connectors thereto in opposite directions;

locating springs between the adapter housings and the adapter frame, wherein the adapter housings are movably mounted to the adapter frame and biased by the springs in a first direction relative to the adapter frame; and connecting at least one retainer to the adapter frame to prevent the adapter housings from exiting the receiving area in the first direction.

26. In an assembly comprising a gang adapter block and a plurality of fiber optic adapters connected to the gang adapter block, wherein the improvement comprises:

each of the plurality of fiber optic adapters being independently floatable along a Z-axis relative to the gang adapter block.

* * * * *